United States Patent [19]

Kumasaka et al.

[11] Patent Number: 4,894,260

[45] Date of Patent: Jan. 16, 1990

[54] ELECTROLESS PLATING METHOD AND APPARATUS

[75] Inventors: Osamu Kumasaka; Nobuki Yamaoka, both of Yamanashi, Japan

[73] Assignees: Pioneer Electronic Corporation, Tokyo; Pioneer Video Corporation, Yamanashi, both of Japan

[21] Appl. No.: 246,387

[22] Filed: Sep. 19, 1988

[30] Foreign Application Priority Data

Sep. 19, 1987 [JP] Japan .................................. 62-235371

[51] Int. Cl.$^4$ .............................................. B05D 3/12
[52] U.S. Cl. ...................................... 427/241; 427/240; 427/425; 427/304; 118/320; 118/416; 118/DIG. 4; 118/52
[58] Field of Search ............... 427/240, 241, 425, 304; 118/416, DIG. 4, 320, 52

[56] References Cited

U.S. PATENT DOCUMENTS

| | | | |
|---|---|---|---|
| 4,066,117 | 1/1978 | Clark | 118/320 |
| 4,124,411 | 11/1978 | Menleman | 427/240 |
| 4,267,212 | 5/1981 | Sakawaki | 427/425 |
| 4,457,259 | 7/1984 | Samuels | 427/425 |
| 4,551,355 | 11/1985 | Ericson | 427/425 |

Primary Examiner—Shrive Beck
Assistant Examiner—Vi D. Dang
Attorney, Agent, or Firm—Sughrue, Mion, Zinn, Macpeak & Seas

[57] ABSTRACT

A method and implementing apparatus for electroless plating an optical disk causes the disk to be positioned in a container with its main surface upturned and then rotated. As the disk rotates, liquid for treating or cleaning the disk is caused to fall on the upturned main surface from a position above the disk.

5 Claims, 2 Drawing Sheets

ELECTROLESS PLATING METHOD AND APPARATUS

BACKGROUND OF THE INVENTION

The present invention relates to a method and apparatus for producing a master disk used in manufacturing information recording disks.

A "stamper" is a term of art describing a thin disk metal mold with an optical pattern on its main surface, used to form an optical disk, such as a compact disk or a laser disk (trade name). The stamper may be prepared according to the following method. An optical pattern is formed on a glass disk, having its surface coated with a photoresist layer by exposing the photoresist layer to laser light modulated with a recording signal and then developing the exposure. Then, electrical conductivity is provided by any suitable means, such as Ag sputtering, Ni evaporating deposition or the like; and Ni is thickly applied by electrocasting.

Electroless plating can be employed for providing the electrical conductivity. The electroless plating is superior to Ni evaporating deposition in abrasion-resistance and corrosion-resistance of the stamper thus prepared. The application of electroless plating a method for producing a master disk for analog records is disclosed in Japanese Patent Application Nos. 46-33500 and 52-160613 by CBS SONY GROUP INC. Because an optical disk has very fine pit rows or guide grooves (track pitch: 1.6μm) formed in its surface as compared with the sound grooves (track pitch: about 100μm) of the analog record, it is more important, in the case where electroless plating is used for producing a stamper, to improve manufacturing precision so that the recorded pit rows can be faithfully reproduced.

An electroless plating method as illustrated in FIG. 1 has been used for subbing treatment of a magnetic hard disk. The operation of the conventional apparatus illustrated in FIG. 1 is as follows. First, a disk 1 to be plated is mounted to a rotary jig 2. Then the jig 2 is moved over a first pretreating solution tank 3 (for example, a sensitizer solution such as a stannous chloride solution), a second pretreating solution tank 4 (for example, an activator solution such as a palladium, chloride solution), a washing tank 5 (pure water) and an electroless plating tank 6 so that the disk 1 together with the jig 2 are soaked in these tanks successively, along the course of the two-dotted chain line shown in FIG. 1. The disk 1 is rotated in the respective tanks to accomplish the plating process.

The first and second pretreating solutions are used in various combinations depending on the quality and property of the disk to be plated, and the pretreating solution tanks to be used may be increased in number to three or more.

The number of washing tanks 5 is not limited to the specific illustration in FIG. 1. For example, one washing tank 5 may be arranged between adjacent treating tanks so that the respective treating solution are not mixed with each other, or two washing tanks 5 may be arranged between adjacent treating tanks in order to more completely wash the disk between pretreatment tanks. The term "treating solution" herein used means a liquid, such as a pretreating solution, a plating solution, a cleaning solution and the like, to be used in a plating process.

A typical treating process (hereinafter called "AD process") according to the electroless plating method using the aforementioned apparatus for subbing treatment of a magnetic disk is carried out by successively executing the following steps (1)–(13) with respect to a blank disk.

(1) Cleaning step
(2) Washing step
(3) Etching step
(4) Washing step
(5) Zinc replacing step
(6) Washing step
(7) Pickling step
(8) Washing step
(9) Zinc replacing step
(10) Washing step
(11) Surface adjusting step
(12) Washing step
(13) Electroless plating step In the cleaning step (1), the disk 1 mounted to the rotary jig 2 is put into the first treating tank (the pretreating solution tank 3 in FIG. 1) together with the jig 2, to the disk 1 while it is rotated by a driving means, such as a motor, provided on the jig. The the rotation of the disk 1 through the jig not only uniformly treats the disk surface but also removes impurities deposited on the disk.

After the cleaning step, the rotary jig 2 with the disk 1 is moved into the second treating tank (the washing tank 5 in FIG. 1), by a conveying means (not shown) or manually so as to carry out the washing step (2). In the second treating tank, the disk 1 is treated in the same manner as in the cleaning step. After the washing step, the disk is similarly treated successively in the etching step (3), in the washing step (4). . . , thereby completing all the steps (1)–(13) described above.

Arranged in the manner described above, the conventional electroless plating apparatus is defective in that it is necessary at all times to keep the respective treating solutions clean. This requires a cleaning means, such as circulatory filtration, in that some treating solutions may deteriorate gradually so that it is difficult to perform uniform treatment at all times, and further in that the rotary jig 2 including movable parts is soaked in the treating solution impurities, such as jig flakes, foreign matters and the like are often suspended in the treating solution. Accordingly, the conventional apparatus is unsuited for precise electroless plating of a stamper.

Further, troublesome masking must be made in the case where only one side of the disk is to be treated, because the disk as a whole is soaked in the treating solutions.

Further, it is necessary at all times to add pure water because the treating solution is more or less brought into the washing tank 5 (pure water). Where a small number of disks are treated, pure water is thus used wastefully.

Further, it is necessary that precipitated plating matter be dissolved by an acid, because such precipitated plating matter is deposited on the rotary jig 2 when the jig is used in all the steps of the electroless plating method.

Further, the treating solution often overflows the tank when the jig 2 is moved from the treating tank to the washing tank, as the form of the jig 2 is complex. In addition, the conventional apparatus has other defects in that, for example, the treating solutions are easily dropped to the outside or scattered in the form of a mist during conveyance of the jig.

SUMMARY OF THE INVENTION

It is therefore an object of the present invention to eliminate the defects in the conventional electroless plating method.

It is another object of the present invention to provide an electroless plating method and apparatus for always accomplishing uniform, faultless plating.

In order to achieve the above objects, according to a first aspect of the present invention, the electroless plating method comprises the step of causing a treating solution to fall onto a main surface of the disk to be plated so as to bring the treating solution into contact with the main surface while the disk is rotated with the main surface upturned.

According to a second aspect of the present invention, the electroless plating method comprises the steps of, while the disk to be plated is rotated with its main surface upturned, causing a plating-pretreating solution fall onto the disk main surface so as to bring the plating-pretreating solution into contact with the main surface, causing a cleaning solution fall on the main surface to thereby clean the main surface, causing a plating solution to call on the main surface to bring the plating solution into contact with the main surface, and causing a cleaning solution to fall on the main surface to thereby clean the main surface.

According to a third aspect of the present invention, the electroless plating apparatus for plating a disk comprises a turntable for carrying the disk, on open-headed and close-bottomed cylindrical body for surrounding the turntable, and a liquid supply means for directing a treating solution to the turntable through the open head of the cylindrical body.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Figure 2:
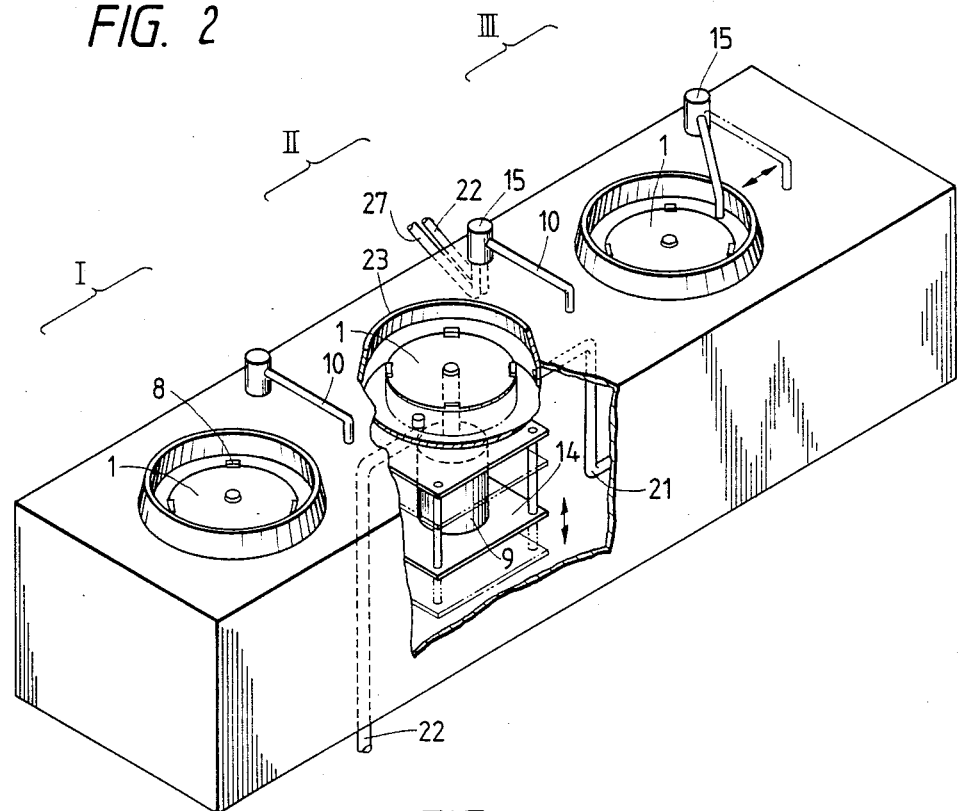
FIG. 2 is a schematic partly cutaway perspective view of an apparatus as one embodiment according to the present invention.
Figure 1:
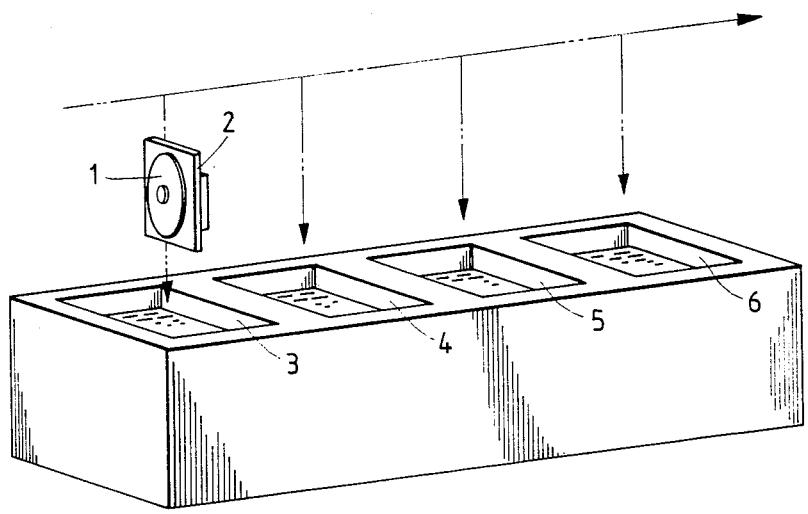
FIG. 1 is a schematic perspective view of part of a conventional apparatus.

Referring to FIG. 2, there is shown an embodiment of the electroless plating apparatus according to the present invention. In the apparatus, cylindrical treating-solution containers 23, each having a top opened to the outside, are embedded in the upper surface of a box-like body of the apparatus. Turntables 8 are rotatably mounted to the respective containers 23 so as to be projected inwards from the center portions of the circular bottoms of the respective containers 23. Turntable elevating mechanisms 14 carrying motors 9 for driving the respective turntables 8 are provided under the respective pairs of turntables 8 and containers 23. The turntables 8 are arranged to be moved up/down by the respective elevating mechanisms 14. Disks 1 to be plated are put on the respective turntables 8. Pipe arms 10. supporting pipings 22 and 27 which communicate with nozzles for pouring treating solutions/cleaning solutions onto the disks 1, are respectively provided on the upper surface of the box-like body in the vicinity of the respective turntables 8. The pipe arms 10 are arranged so that the nozzles formed at the free ends of the respective pipe arms 10 can be moved above the respective turntables 8 and disks 1 by turning the respective pipe arm supports 15. Pure water pipings 22 and waste fluid pipings 21 are opened at the bottom portions of the respective containers 23.

One set of the turntable 8, the motor 9 and the arm 10 are provided for each treating solution. For example, in the case where a, disk is treated with three solutions consisting of two pretreating solutions and one plating solution, the apparatus is provided with three sets of the turntables 8, the motors 9 and the arms 10 at the three stages I, II and III as shown in FIG. 2.

Figure 3:
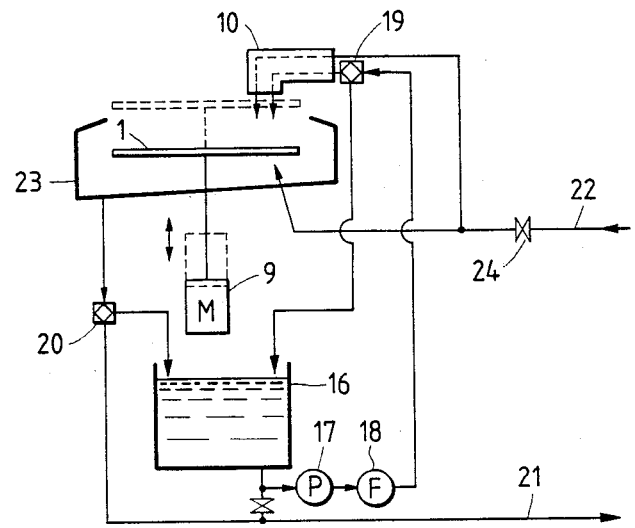
FIG. 3 is a piping system diagram showing part of the apparatus of FIG. 2.

Referring to FIG. 3 there is shown a piping system for one stage in the apparatus. The three stages I. II and III have substantially the same piping systems. In each piping system there are provided a treating solution tank 16, a pump 17 for sending the treating solution, a filter 18 arranged in series with the pump 17, a three-way valve 19 for channeling the treating solution from pump 17 into either the tank 16 or the nozzle 10 above the disk 1. and a three-way valve 20 for channeling the treating solution collected after it flows over the disk 1 into either the treating solution tank 16 or the waste liquid piping 21. In order to spray pure water onto both sides of the disk, the pure water piping 22 is made to branch into two nozzles: that is, one nozzle at the free end of the pipe arm 10 and the other nozzle under the disk.

In the following, the operation of the apparatus according to the present invention is described.

If a disk 1 is mounted to the turntable 8 in stage I for the first pretreatment A, the turntable 8 is moved down by the operation of the turntable elevating mechanism 14. Then, the free end of the pipe arm 10 is moved above the disk 1 by the rotation of the pipe arm support 15, and the three-way valve 19 is opened to the treatment side so that the treating solution form the pump 17 is passed through the filter 18 and sprayed onto the surface of the disk 1. As the disk 1 is rotated at the speed of 10 to 100r.p.m. by the motor 9, the treating solution is collected in the treating solution container 23. Because the recovery change over three-way valve 20 is opened to the treating solution tank 16 at this time, the treating solution once used is recovered to the treating solution tank 16. After the free end of the pipe arm 10 makes a reciprocating motion between the inner and outer circumferences at the speed of 3–20 seconds per reciprocation based on the predetermined time required for the treatment, the treating solution channeling three-way valve 19 is opened to the treating solution tank 16 side to recirculate the treating solution. Thereafter, the pure water valve 24 is opened so that pure water is poured onto both surfaces of the disk 1 from the upper and lower sides through the pure water piping 22. Because the recovery valve is opened to the waste liquid piping 21 side at this time, the pure water is not mixed with the treating solution in the treating solution tank 16, so that the concentration of the solution is not reduced, After the first pretreatment and washing procedure, the pipe arm 10 is moved to a position suitable for removing the disk 1 from the container 23 and the turntable B with the disk 1 is moved up to their original height by elevating mechanism 14. At the same time, the motor 9 stops rotating. After the motor 9 has stopped, the disk 1 is carried by a conveying mechanism or manually to stage II for the second pretreatment B so as to be treated by the same procedure as that of stage I for the pretreatment A.

After the second pretreatment and washing procedure the disk 1 is carried to stage III for electroless plating where the electroless plating is applied to the disk in the same manner as that of the pretreatment to thereby complete plating.

Because the liquids used in the aforementioned procedures, that is, the respective treating solutions (inclusive of the electroless plating solution) and the pure water, always flow from the center of the disk toward the outer circumferential edge thereof foreign matters deposited on the disk 1 are washed away, and impurities mixed into the liquids are not deposited on the surface of the disk 1.

Generally, the electroless plating reaction produces hydrogen gas as a secondary product so that pinholes are often formed by the deposition of hydrogen bubbles. In this liquid-flow type plating however, such hydrogen bubbles are washed away by the liquid flow, so that a plating film without defects can be prepared.

In practice, on examination of a master disk for making laser disks (tradename) prepared using conventional electroless plating, innumerable pinholes were formed. To the contrary, on of a master disk prepared using the apparatus according to the present invention, no pinholes were formed.

Conditions for those examination are shown in Table 1.

TABLE 1

| Liquid composition | Sensitizer treating solution |
|---|---|
| | SnCl$_2$ 15 g/l, HCl 10 cc/l, and pure water as a residual part. |
| | Activator treating solution |
| | PdCl$_2$ 1 g/l, HCl 1 cc/l, and pure water as a residual part. |
| | Plating solution |
| | NIMUDEN DX (C. UEMURA Co., Ltd.) pH 5.5 adjusted, 65° C. |
| Turntable revolution speed | 40 rpm |
| Pipe arm reciprocating speed | 6 seconds per reciprocation |
| Treating time and liquid quantity | |
| Sensitizer | 0.5 l/minute × 3 minutes |
| Activator | 0.3 l/minute × 2 minutes |
| Plating solution | 1 l/minute × 5 minutes |
| Washing with pure water (in each stage) | 5 l/minute × 1.5 minutes |

When, as a test, the speed of the turntable was increased to more than 100r.p.m., the relative speed of the treating solution, particularly in the sensitizer and activator stages, was so large that the adsorption of Sn and Pd ions was poor to causing precipitation irregularity. The same defect arose when the pressure of the pump 17 was too high in the aforementioned stages.

In the case where the speed was reduced to less than 10r.p.m., the treating solution stagnated on the disk so that the transition from the old treating solution to the new treating solution went badly, making uniform treatment impossible.

If the speed of reciprocation, omission of treatment on the disk surface occurred, so that the treatment state became uneven. If the speed of reciprocation of the pipe arm was less than 3 seconds per reciprocation, the relative speed of the treating solution was so large that precipitation irregularity arose in the same manner as that in the high-speed revolution of the turntable.

Although the aforementioned embodiment describes the case where a plating process comprises three stages inclusive of two stages using pretreating solutions, the number of stages is not limited thereto. For example, because the AD process needs seven treating solutions (exclusive water), the AD, process can be carried out by seven stages.

In the process of producing a master optical disk, a developing process after signal exposure is provided before the aforementioned electroless plating process. Because the developing process can be also carried out by the apparatus as shown in FIG. 2. the developing process can be continuously and automatically combined with the electroless plating process unlike the case where sputtering. evaporating deposition or the like is generally used as the means for giving electrical conductivity.

Although the hereinabove describes embodiment illustrates one pump 17 for the dual purpose of circulatory filtration and liquid feeding, the present invention is not limited to such a case but is also applicable to the case where liquid feeding is by the pressure of N$_2$ gas.

Although the treating solution tank 16 in this embodiment is merely used as a receptacle, the tank may include sensors and heaters for adjusting conditions of temperature, pH, concentration and the like, and exits for exhausting adjustment solutions because the plating solution and the like often must be adjusted with respect to these conditions.

Figure 4:
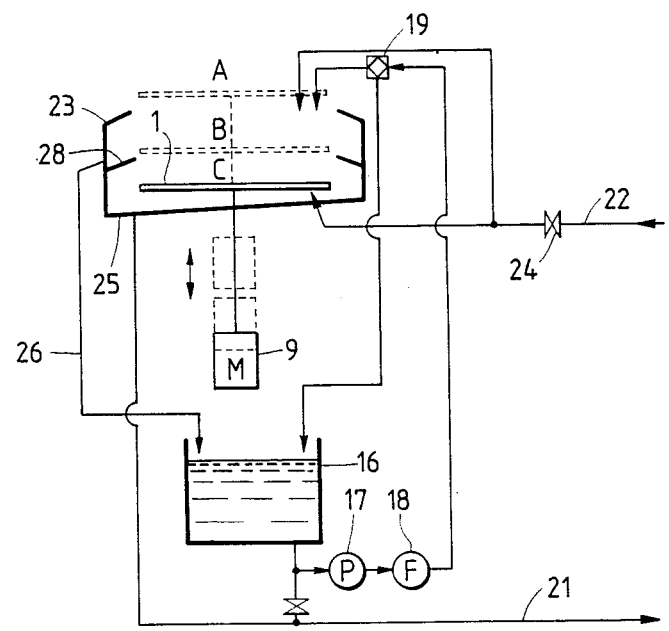
FIG. 4 is a piping system diagram showing part of an apparatus as another embodiment according to the present invention.

Referring to FIG. 4. there is shown another embodiment of the piping system according to the present invention. In the piping system of FIG. 3 as described above, the treating solution and water after treatment are separated by the three-way valve 20. In the embodiment of FIG. 4, however, the speed of the disk is increased to some degree, and the container 23 is provided with an intermediate partition 28 so as to provide a small interval between the circumferential portion of the partition 28 and the disk 1, so that the treating solution and water can be separated. In the drawing, the disk 1, after being mounted onto the turntable 8 at the uppermost position A, is moved down to the intermediate position B where it is treated with the treating solution. The treating solution is brought into the container 23 by centrifugal force and then returned to the treating solution tank 16 through a treating solution return piping 26. After treatment, the disk 1 is moved down to the lowermost position C so as to be cleaned with pure water. At this time, the pure water is not mixed into the treating solution because the pure water after cleaning is collected in a pure water containing portion 25 and then flows out therefrom through the waste liquid piping 21.

Although the aforementioned two embodiments have been explained with reference to an electroless plating process, the embodiments are applicable to other treating processes, such as an etching process, an activating process, a passivating process and the like, as long as clean and precise surface treatment need be applied to one side of the disk after being treated with water. Further, these processes may be continuously and automatically combined with the aforementioned electroless plating process.

Although the embodiments have shown all treating solutions circulatedly filtrated and recovered for reuse, all treating solutions collected in the treating containers 23 may be exhausted directly to the waste liquid piping 21 without provision of the recovery three-way valve 20 of FIG. 3 in the case, where the treating solutions are of low cost or in the case where the treating solutions cannot be used again. In those cases, the apparatus becomes more simple in construction.

A plurality of treating solution pipings may be connected to one pipe arm 10 so that more than one treatment can be made in one stage. For example, if the solutions for pretreatments A and B serve as disposable matters, the four treatments of pretreatment A, washing, pretreatment B, and washing can be made in one stage to thereby make it possible to reduce the size and cost of the apparatus as well as shorten the time required for the movement of the disk.

In the case where circulatory filtration is unnecessary, the start and stop of the treatment may be carried out by the ON-OFF operation of the pump 17 without provision of the circulatory filtration return piping 27 and the treating solution three-way valve 19.

Although the embodiments have shown the case where the treating solution is dropped onto the disk 1 from the nozzle through the pipe art 1, the treating solution may be sprayed to the disk through a shower nozzle provided at the free end of the pipe arm 10 in order to improve the uniformity of the treatment.

As described above, according to the present invention, the plating solution is brought into contact with the main surface of the disk by the falling of the plating solution while the disk is rotated. Accordingly, a radially outward flow of liquid is formed to wash out hydrogen bubbles and impurities during the reaction or cleaning, so that a faultless plating film free from pinholes can be prepared. Further, as the falling part of the plating solution can be recovered and filtrated, the quantity of plating solution per unit treatment can be reduced, and the capacity of the plating circulatory filtration unit can be saved.

Further, the apparatus is preferable in that only a pure cleaning solution can be used without repeatedly using the cleaning tank. Even in the case where a pure cleaning solution is recycled, the cleaning capacity of the cleaning solution can be saved compared with the conventional case where the disk is soaked or bathed in the cleaning tank. Pretreatment and cleaning can be substantially simultaneously made on one turntable to thereby realize time saving.

Because the electroless plating treatment is made while the treating solutions inclusive of pure water are poured onto the rotating disk from above, an electroless plating film can be prepared on one side of the disk. Accordingly, the present invention is applicable to the production of a stamper so as to prepare a good stamper which is faultless (in dropout, error rate) and superior in corrosion-resistance and abrasion-resistance.

Further, according to the present invention, the respective treating solutions are used by recycling their minimum quantities which can be controlled. Accordingly, the quantities of the treating solutions can be saved. With respect to pure water, only a necessary quantity can be used in predetermined points. Accordingly, remarkable water saving can be realized compared with the conventional case where overflow of pure water is required at all times.

Further, according to the present invention, washing with pure water is always carried out at every stage before the disk is moved to the next stage. Accordingly, scattering of a treating solution mist or staining of the apparatus can be prevented.

According to the present invention, the recycled treating solution is returned by the three-way valve after being carried up to a predetermined point. Accordingly, the treating solution in its piping can be kept clean. Because the temperature of the piping is controlled to be equalized to that of the treating solution, the temperature of the treating solution is not influenced by the temperature difference from the piping even when the three-way valve is switched to pour the solution onto the disk.

WHAT IS CLAIMED IS:

1. An electroless plating method for plating a disk, comprising the steps of rotating said disk to be plated with its main surface upturned, causing a plating-pretreating solution to fall onto said main surface from above said main surface so as to bring said plating-pretreating solution into contact with said main surface, causing a cleaning solution to fall from above said main surface onto said main surface to thereby clean said main surface, causing a plating solution to fall from above said main surface onto said main surface to bring said plating solution into contact with said main surface, and causing a cleaning solution to fall from above said main surface onto said main surface to thereby clean said main surface.

2. An electroless plating method according to claim 1, wherein the respective steps of causing said plating-pretreating solution, said cleaning solution and said plating solution to fall on said main surface includes the steps of one of dropping and spraying the respective solution onto the main surface.

3. An electroless plating appratus for plating a disk, comprising:
    a turntable for carrying said disk thereon;
    an open-headed and close-bottomed cylindrical container for surrounding said turntable; and
    a liquid supply means for separately causing a cleaning solution and a treating solution individually to fall toward said turntable through the open head of said cylindrical container.

4. An electroless plating apparatus according to claim 3, further including means for moving said turntable to either one of upper and lower positions along its rotational axis, and wherein said cylindrical container includes an intermediate partition having an opening to a flange extending inwardly to the outer edge of said turntable when said turntable is in the middle between said upper position and said lower position: said intermediate partition sloping down, and outwardly to thereby communicate with a recovery hole provided in an upper-half portion of the inside of said cylindrical container separated by said intermediate partition.

5. An electroless plating apparatus according to claim 3, wherein said liquid supply means comprises a treating solution tank, a pump for pumping the treating solution form said tank to a first three way valve, a treating solution return pipe and a nozzle means coupled to two outputs of said first three way valve, said nozzle means having means to reciprocate a nozzle of said nozzle means between the interior and exterior of said main surface, a water line coupled to said nozzle means, and a liquid return means comprising a second three way valve, a first pipe connected to said second three way valve for returning liquid to said tank and a second pipe to coupled to said second three way valve for discharging liquid from said container to a waste pipe.

* * * * *